(No Model.) 5 Sheets—Sheet 1.

E. CLAVIEZ.
CHANGE BOX MECHANISM FOR POWER LOOMS.

No. 572,245. Patented Dec. 1, 1896.

Fig. 5.ª

Witnesses
H. van Oldenneel
E. A. Scott

Inventor
Emil Claviez
by
Attorneys (No Model.)  5 Sheets—Sheet 2.
E. CLAVIEZ.
CHANGE BOX MECHANISM FOR POWER LOOMS.
No. 572,245.  Patented Dec. 1, 1896.
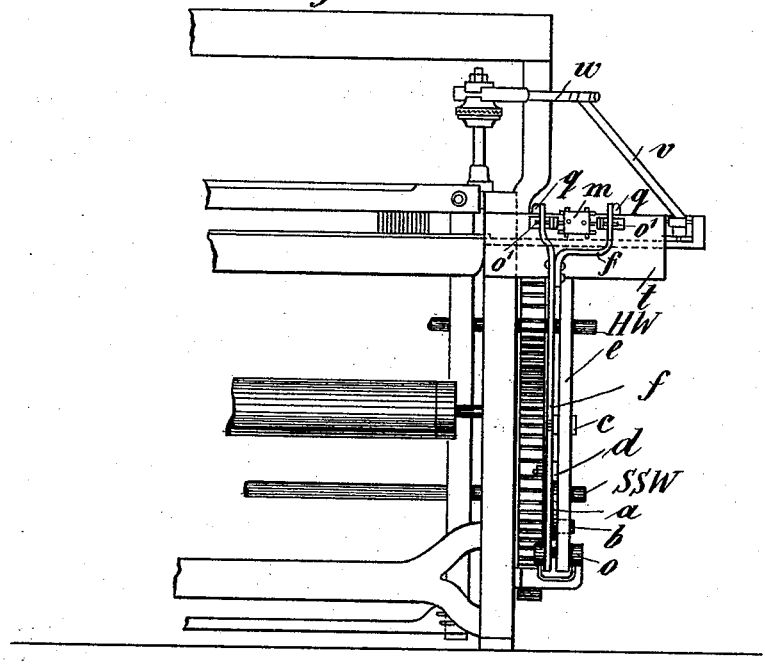
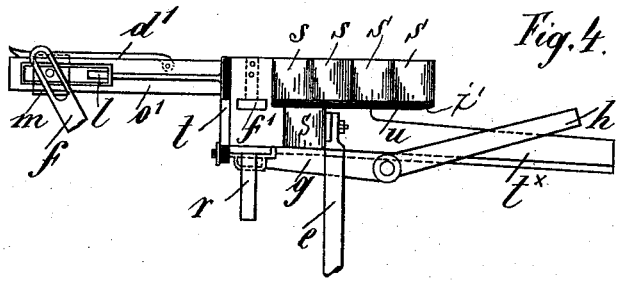
Witnesses
H. van Oldenneel
E. A. Scott
Inventor
Emil Claviez
by
Attorneys (No Model.) 5 Sheets—Sheet 3.
E. CLAVIEZ.
CHANGE BOX MECHANISM FOR POWER LOOMS.
No. 572,245. Patented Dec. 1, 1896.
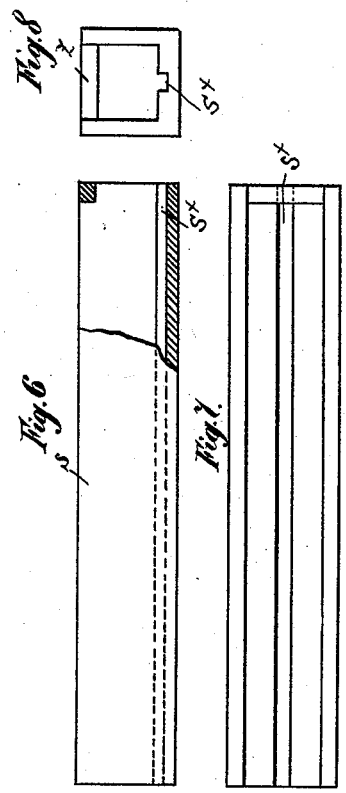
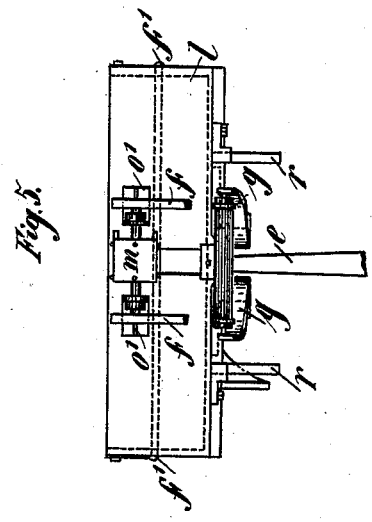
Witnesses
H. van Degennee
E. A. Scott
Inventor
Emil Claviez
by
Attorneys (No Model.) 5 Sheets—Sheet 4.
E. CLAVIEZ.
CHANGE BOX MECHANISM FOR POWER LOOMS.
No. 572,245. Patented Dec. 1, 1896.
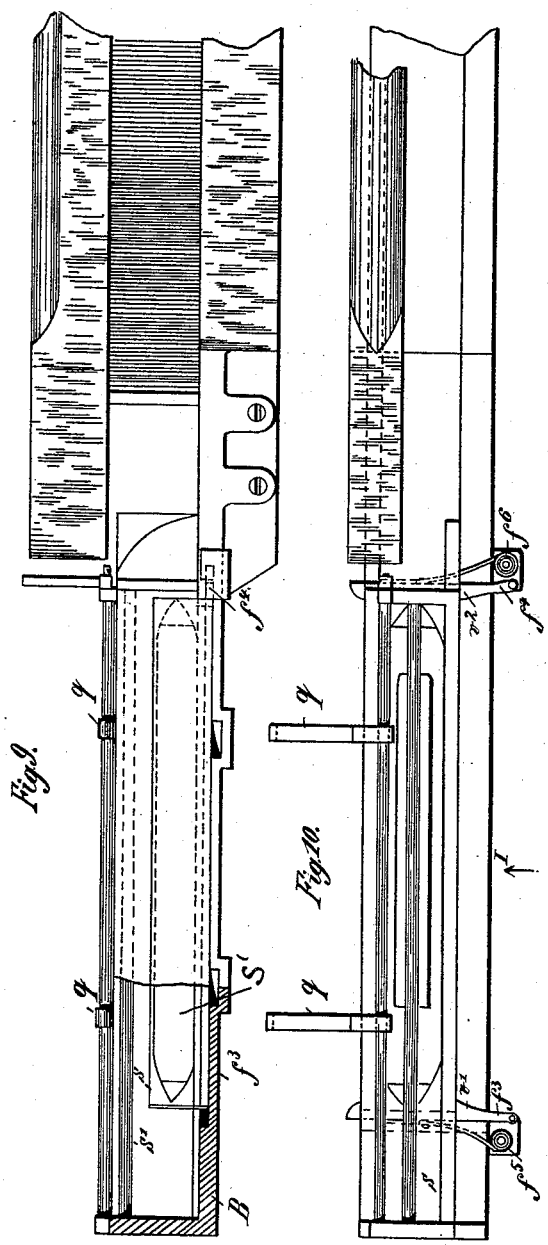
Witnesses
H. van Oldenneel
E. A. Scott
Inventor
Emil Claviez
by [signature]
Attorneys (No Model.)  5 Sheets—Sheet 5.

E. CLAVIEZ.
CHANGE BOX MECHANISM FOR POWER LOOMS.

No. 572,245. Patented Dec. 1, 1896.

Witnesses
H. van Oldenneel
E. A. Scott

Inventor
Emil Claviez
by    Attorneys

UNITED STATES PATENT OFFICE.

EMIL CLAVIEZ, OF CHEMNITZ, GERMANY, ASSIGNOR TO KUNSTWEBEREI, CLAVIEZ & CO., GESELLSCHAFT MIT BESCHRÄNKTER HAFTUNG, OF LEIPSIC, GERMANY.

CHANGE-BOX MECHANISM FOR POWER-LOOMS.

SPECIFICATION forming part of Letters Patent No. 572,245, dated December 1, 1896.

Application filed January 28, 1896. Serial No. 577,198. (No model.) Patented in Germany November 23, 1893, No. 78,904; in Austria-Hungary December 30, 1893, No. 1,687 and No. 33,600; in England January 10, 1894, No. 553; in France January 20, 1894, No. 235,675, and in Belgium January 27, 1894, No. 108,303.

*To all whom it may concern:*

Be it known that I, EMIL CLAVIEZ, general director, of Chemnitz, in the Kingdom of Saxony and German Empire, have invented a new and useful Improvement in and Appertaining to the Change-Box Mechanism for Power-Looms, of which the following is a specification, reference being had therein to the accompanying drawings.

The invention has been patented in Germany, No. 78,904, dated November 23, 1893; in Austria-Hungary, No. 1,687 and No. 33,600, dated December 30, 1893; in France, No. 235,675, dated January 20, 1894; in Belgium, No. 108,303, dated January 27, 1894, and in England, No. 553, dated January 10, 1894.

This invention is to provide a change-box, so that square patterns in numerous varieties, as in the manufacture of chenille, and chenille and other goods, can be produced by means of the mechanical loom. When the colors have been very varied, it has not hitherto been possible to systematically make use of the mechanical loom, but preference has been given to prepare the goods on hand-looms, as in the case of chenille goods, for instance.

The working of a loom to which this invention is applied becomes very simple. The worker need only replace the color which has just been changed by the following last color.

Figure 1:
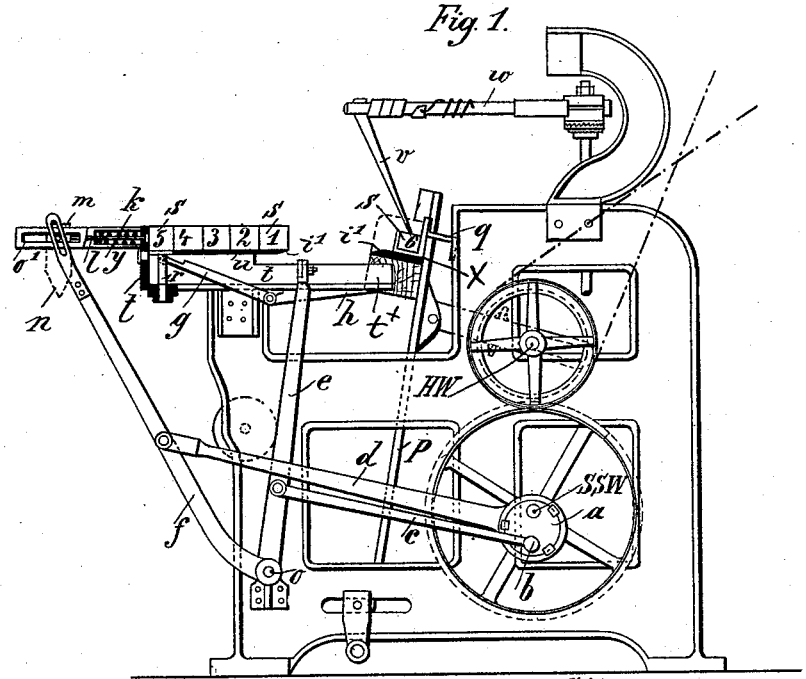
Figure 3:
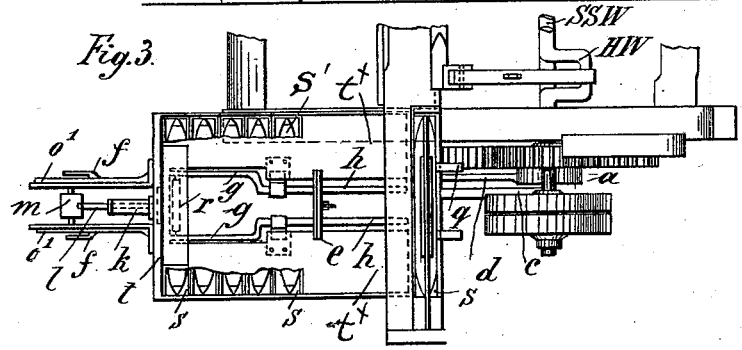

Figure 1 is a side view of a mechanical loom having the new change-box applied to it. Fig. 2 is a front view of the same, taken from the front work side. Fig. 3 is a top view of the apparatus. Fig. 4 is a side view of the change appliance shown in Fig. 1, but to a larger scale. Fig. 5 is a front view of the same, but also to a larger scale corresponding to Fig. 4. Fig. 5ª is a view of a detail. Figs. 6, 7, and 8 are three views of the shuttle-box. Figs. 9 and 10 are two views of the box to a larger scale. Figs. 11 to 14 show how the boxes can be changed by electrical means when the colors are in a large variety.

The construction of the loom is characterized by the following elements:

The loom may be driven, as usual, by means of the main shaft H W, the movement being transmitted by means of gear-wheels to the shaft S S W, operating the picker-arm $w$ by means of an eccentric, as usual. An eccentric-disk $a$, Fig. 1, is fastened to the shaft S S W, which sets into a swinging motion, by means of the eccentric-rod $d$, a forked lever $f$, turning on a pivot $o$. An eccentric-pin $b$ on the eccentric-disk $a$ can set, by means of a rod $c$, into a to-and-fro motion a second lever $e$, movable on a pivot $o$. A box $t$ is applied to the upper part of the loom near to the breast-beam which is opened above and has a partition $u$ in its interior, provided at its left-hand side with an opening (see Figs. 1 and 4) into which a small table $r$ can slide from underneath. The under part of the box $t$ is provided with a prolongation $t^\times$, which extends to the rear, Fig. 1. The front side of the box just named carries two angular rails $o'$ with slits therein, Figs. 1, 2, 3, and 5. A small pattern-cylinder $m$ slides in the said slits, which cylinder receives at both ends a to-and-fro motion by means of the forked lever $f$, which embraces the rails, as hereinbefore mentioned. Between these rails there is a spring-box $k$, Figs. 1 and 3, in which a pin $l$ can be pushed to and fro. On the partition $u$ there lie the shuttle-boxes $s$ with the shuttles $S'$ in a row after each other and in such a manner that the color which is to be worked is always in box No. 5, Fig. 1.

In the drawings six shuttle-boxes are shown, but more can be made use of, as required. Figs. 6 to 8 show the construction of these shuttle-boxes. The latter can be made of wood or metal. The bottom of the shuttle-box $s$ is provided with a groove $S^\times$, Figs. 6, 7, and 8, which serves for guiding the picker.

Figure 11:
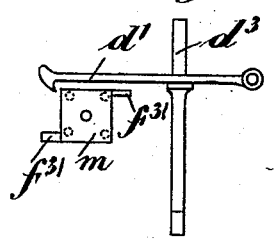
Figure 12:
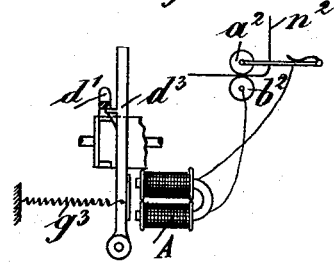
Figure 13:
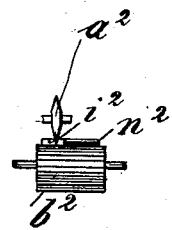
Figure 14:
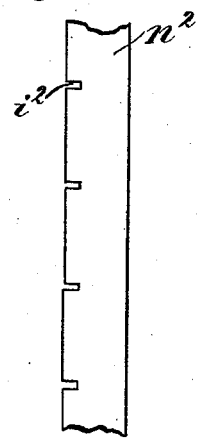

The mode of working of the parts may be briefly explained as follows: A certain pattern-card $n$, as desired, and having perforated and unperforated parts, is placed about the pattern-cylinder $m$, Fig. 1. Supposing, now, the eccentric $a$ is set in motion, the pattern-cylinder is then pressed to the pin $l$. If the part of the card opposite to the pin $l$ is perforated, the pin will pass unimpeded through such perforated part. In the contrary case, however, if the card happens to be unperforated at the part then pin $l$ is pressed to the right and its rear end presses on the first shuttle-box $s$. While this is taking place, however, the change-box X, Fig. 1, has arrived at the last of the shuttle-boxes, so that both the sloping edges $i'$ $i'$ come together. The pin $l$, which, as already mentioned, presses on the shuttle-box No. 1, pushes forward all five boxes the width of one box, and as a result shuttle-box No. 5 is pushed into the race. Box No. 6, which has just been used, is pressed out from behind by means of shuttle No. 5. Two angular-shaped arms $q$ prevent box 6, which has last been shoved out of its proper place, from falling out. The latter will then fall on the prolongation $t^\times$ of the box $t$. It will then be seized by pusher $e$, which is moving to the left, (see Fig. 4,) and be carried to the left until at length it comes to the table $r$, Fig. 4. Since, however, the latter is controlled by the two angular levers $g\ h\ g\ h$, the table will only be lifted with the thrown-out box when pusher $e$ moves to the right, and thereby the parts $h$ of the angular levers become depressed, which has as a consequence that the other ends $g$ become elevated with the table and box. In order that the shuttle-boxes may not fall down on the return of the table $r$, the box is held by two spring-catches $f'$, Figs. 4 and 5. The shuttle-box inserted in this manner will then work until an unperforated card reaches the pin $l$, whereupon the work is repeated afresh. It may be here observed that a pattern-cylinder can be moved in any known manner by means of pins and hooks $d'$, that is, supposing the pattern-cylinder to be reciprocated, as before mentioned, and the hook $d'$ to be relatively stationary, as shown in Fig. 11, each time the cylinder moves back the hook will turn it one step.

Figs. 9 and 10 show the appliance for retaining the shuttle-boxes in the race.

The race-course B is somewhat sunk in at the tables where the shuttle-box $s$ is situated, so that during the movement it cannot move to and fro. Moreover, the box is held by means of two catches $f^3$ $f^4$, which are constantly pressed on the shuttle-box by means of springs $f^5$ $f^6$, whereby any sidewise slide is avoided.

If a new box is shot in, which takes place in the direction of the arrow I, the catches $f^4$ and $f^3$ will be pressed apart by means of the corners of the box, while the corners slide on the noses $v'$ $v^2$, and by that means press them apart, so that the box which has just been used escapes in the rear and the new one can enter. As soon as the new box has been put in the race the spring-catches seize it and hold it fast, as described. The picker or striking part slides on the rod $s'$. To avoid using too many cards when there is a large variety of colors, the shuttle-box can be changed in the following manner by means of the pattern-cylinder: Two opposite sides of the said cylinder are provided with holes, while the two others remain solid. If now a thread of any color is being used, a perforated side will stand before the pin $l$, Fig. 3, and it will do so until a change in the color has to be made, and the hook $d'$, Fig. 4, stands in a raised position, that it cannot move the cylinder on the to-and-fro motion, and consequently it cannot turn. A pattern-strip passes between two metallic rolls, which are connected with an electric battery. For each change of color this strip $n^2$ has a notch $i^2$, Fig. 14, so that the spring-roller $a^2$, Fig. 12, moves with the fixed one $b^2$. As soon as the roll $a^2$, standing under spring-pressure, springs into the slit $i^2$, both rolls $a^2$ and $b^2$ come in metallic contact. The circuit is thus closed and a small electromagnet A draws back the catch $d^3$, on the drawing toward the right, so that the change-hook $d'$ will then lie on the cylinder $m$ and can then turn. A solid side will now be presented to the pin $l$ and the changing of the box takes place. For a second time the change-hook moves, and can, by means of a piece $f^{31}$, attached to the pattern-cylinder, be raised so high that the catch $d^3$, Fig. 12, which in the interim has again become free, is drawn to the left by means of a small spring $g^3$, and consequently the change-link is prevented from falling. The worker has then only to replace the color which has just been changed by the color following as the sixth in the shuttle-box. He has therefore to take care that the color which is to be worked next is contained in the shuttle-box No. 5, which can easily be controlled by means of a color-table or rapport-table.

In order that by the retrograde motion of the table $r$, Figs. 4, 5, and 5$^a$, the shuttle-box may not fall down after having been carried by the table $r$, it is held by two catch-springs $f$, Figs. 4, 5, and 5$^a$. As soon as the table $r$ touches in its upward motion with its shuttle-box S the cams of the catch-springs $f'$ they move in the direction indicated by the arrows in Fig. 5$^a$. When the shuttle-box S has reached the top, the table $r$ moves more rapidly downward, with the result that the springs $f'$ $f'$ return by means of their elasticity to their original positions, $i.\ e.$, the cams of the springs $f'$ place themselves on both sides under the shuttle-box S, thereby preventing the shuttle-box from falling down on the table $r$.

What I claim, and desire to secure by Letters Patent of the United States, is—

1. In combination, the lay having the raceway provided with an opening from front to rear for the passage of a shuttle-box, the box $t$ at the front of the loom for holding a series of shuttles and having an upper plate $u$ in line with the bottom of the raceway when the lay is forward, means for transferring the shuttle-boxes from the upper plate $u$ to the lay and for pushing out of the raceway the previously-used shuttle-box, the said box $t$ having a rearward extension reaching to the rear of the lay when forward to receive the used shuttle-box from the rear of the lay and means for raising the shuttle-boxes from the lower part of the box $t$ to the upper plate thereof, substantially as described.

2. In combination, in a loom, the lay having an opening from front to the rear for the passage of the used shuttle-box, means for thrusting the shuttle-boxes into the raceway and the catches $f^3\ f^4$ having the noses $v'\ v^2$ for holding the shuttle-boxes on the lay, substantially as described.

3. In combination in a loom, the lay having a depressed seat for receiving the shuttle-boxes and a passage to allow them to enter at the front and be discharged at the rear, the catches for holding the boxes in place in said depressed portion and means for moving the shuttle-boxes from front to the rear, substantially as described.

4. In combination, the lay having a passage from front to rear for the shuttle-boxes, the angular pieces $q$ on the rear of the lay to direct the discharge of the shuttle-boxes therefrom, the box $t$ for holding a series of shuttle-boxes, and having the rear extension to receive the shuttle-boxes from the angular pieces $q$, and means for operating the shuttle-boxes to and from the box $t$, substantially as described.

5. In combination, the lay, the box $t$ for holding a series of shuttle-boxes, it having the upper plate $u$, the elevating-table or the pusher $e$, the lever having arms $g$, $h$, for controlling the elevating-table and means for moving the shuttle-boxes from the plate $u$ to the raceway, substantially as described.

6. In combination, the lay having the raceway, the box $t$ having the upper and lower parts for receiving the shuttle-boxes, the elevating means for the shuttle-boxes and the catches $f'$ for holding the elevated shuttle-box in its upper position, substantially as described.

7. In combination, the lay and the shuttle-box, feeding means comprising the rotary pattern-cylinder, the hook $d'$ for operating it, a catch controlling said hook, an electromagnet for withdrawing the catch, the circuit and the make-and-break device comprising the contact-points and the traveling ribbon having openings through which said points may contact, substantially as described.

In witness whereof I have hereunto set my hand in presence of two witnesses.

EMIL CLAVIEZ.

Witnesses:
PAUL SOLMBU,
RICHARD BLOBEL.